(12) United States Patent
Faifkov et al.

(10) Patent No.: US 8,321,218 B2
(45) Date of Patent: Nov. 27, 2012

(54) SEARCHING IN AUDIO SPEECH (75) Inventors: Ronen Faifkov, Rehovot (IL); Rabin Cohen-Tov, Rehovot (IL); Adam Simone, Rehovot (IL)

(73) Assignee: L.N.T.S. Linguistech Solutions Ltd, Rosh Ha'Ayin (IL)

( * ) Notice: Subject to any disclaimer, the term of this patent is extended or adjusted under 35 U.S.C. 154(b) by 769 days.

(21) Appl. No.: 12/488,097

(22) Filed: Jun. 19, 2009

(65) Prior Publication Data

US 2010/0324900 A1 Dec. 23, 2010

(51) Int. Cl.
*G10L 15/00* (2006.01)
(52) U.S. Cl. ............... 704/235; 704/251; 369/25.01
(58) Field of Classification Search .......... 704/235, 704/251; 369/25.01
See application file for complete search history.

(56) References Cited

U.S. PATENT DOCUMENTS

| | | | |
|---|---|---|---|
| 6,092,065 A | 7/2000 | Floratos et al. | |
| 6,249,763 B1 * | 6/2001 | Minematsu | 704/252 |
| 6,873,993 B2 | 3/2005 | Charlesworth et al. | |
| 7,263,484 B1 | 8/2007 | Cardillo et al. | |
| 7,286,989 B1 | 10/2007 | Niedermair et al. | |
| 7,295,980 B2 | 11/2007 | Garner et al. | |
| 7,437,290 B2 * | 10/2008 | Danieli | 704/251 |
| 2005/0010412 A1 | 1/2005 | Aronowitz | |
| 2009/0306984 A1 * | 12/2009 | Mark et al. | 704/257 |

FOREIGN PATENT DOCUMENTS
WO WO2009032672 A1 3/2009

OTHER PUBLICATIONS

"A Fast Lattice-Based Approach to Vocabulary Independent Word Spotting*" by D. A. James et al., *To Appear, Proc. ICASSP 1994, Adelaide.
"Fast Implementation Methods for Viterbi-Based Word-Spotting", by K.M. Knill et al., Proc. ICASSP-96, IEEE 1996.
"Comparison of Keyword Spotting Approaches for Informal Continuous Speech", by Igor Szoke et al., in MLMI (2005).
"Fast Approximate Spoken Term Detection from Sequence of Phonemes", by Joel Pinto et al., Jun. 2008, IDIAP Research Institute.
"Fast Approximate Spoken Term Detection from Sequence of Phonemes" Joel Pinto et al., SIGIR '08, Jul. 2008, pp. 28-33.

* cited by examiner

*Primary Examiner* — Daniel D Abebe (57) ABSTRACT

A computerized method of detecting a target word in a speech signal. A speech recognition engine and a previously constructed phoneme model is provided. The speech signal is input into the speech recognition engine. Based on the phoneme model, the input speech signal is indexed. A time-ordered list is stored representing n-best phoneme candidates of the input speech signal and phonemes of the input speech signal in multiple phoneme frames. The target word is transcribed into a transcription of target phonemes. The time-ordered list of n-best phoneme candidates is searched for a locus of said target phonemes. While searching, scoring is based on the ranking of the phoneme candidates among the n-best phoneme candidates and based on the number of the target phonemes found. A composite score of the probability of an occurrence of the target word is produced. When the composite score is higher than a threshold, start and finish times are output which bound the locus. The start and finish times are input into an algorithm adapted for sequence alignment based on dynamic programming for aligning a portion of the phoneme frames with the target phonemes.

11 Claims, 6 Drawing Sheets

SEARCHING IN AUDIO SPEECH

BACKGROUND

1. Technical Field

The present invention relates to speech recognition and, more particularly to a method for searching an audio speech for a word or phrase.

2. Description of Related Art

Spoken term detection or word spotting refers to detecting one or more target words or a phrase in speech. Spoken term detection is useful in searching recorded speech such as conversational telephone speech. A spoken term detection process includes two steps: indexing and searching. During indexing, speech is processed and stored in a structure relatively easy to search known as an index. The input speech signal is tagged using a sequence of recognized words or phonemes. In the search stage, the index is searched and the exact location (time) of the target word is determined. One prior art approach to spoken term detection is based on the use of word lattices obtained from large vocabulary continuous speech recognition LVCSR. A word lattice is a compact representation of the multiple word hypotheses for a given speech utterance. A drawback in the word lattice based approach is its inability to detect out-of-vocabulary words in the LVCSR system. Search terms are often names of persons or places which evolve over time and updating the language model and dictionary is necessary. Word lattice based spoken term detection systems require a large index space and indexing is slow, but search is instantaneous.

TIMIT is a corpus of phonemically and lexically transcribed speech of American English speakers of different sexes and dialects. Each transcribed element has been delineated in time. TIMIT was designed to further acoustic-phonetic knowledge and automatic speech recognition systems. It was commissioned by DARPA and worked on by many sites, including Texas Instruments (TI) and Massachusetts Institute of Technology (MIT), hence the corpus' name. The 61 phoneme classes presented in TIMIT can been further collapsed or folded into 39 classes using a standard folding technique by one skilled in the art.

The Smith-Waterman algorithm is a well-known algorithm for performing local sequence alignment; for determining similar regions between two nucleotide or protein sequences. The Smith-Waterman algorithm compares segments of all possible lengths and optimizes the similarity measure. The algorithm was first proposed by Temple Smith and Michael Waterman in 1981. is a variation of the Needleman-Wunsch algorithm which are examples of dynamic programming algorithms. As such, Smith-Waterman has the desirable property that it is guaranteed to find the optimal local alignment with respect to the scoring system being used which includes the substitution matrix and the gap-scoring scheme.

A matrix H is built as follows:

$$H(i, 0) = 0, 0 \leq i \leq m$$

$$H(0, j) = 0, 0 \leq j \leq n$$

$$H(i, j) = \max \begin{cases} 0 \\ H(i-1, j-1) + w(a_i, b_j) & \text{Match/Mismatch} \\ H(i-1, j) + w(a_i, -) & \text{Deletion} \\ H(i, j-1) + w(-, b_j) & \text{Insertion} \end{cases}$$

$$1 \leq i \leq m, 1 \leq j \leq n$$

where:
a, b=strings over the alphabet $\Sigma$
m=length(a)
n=length(b)
H(i,j) is the maximum similarity score between the substring of a of length i, and the substring of b of length j.
w□c, d□, c, d∈□u {'−'} '−' is the gap scoring scheme.

In human language, the term "phoneme" as used herein is the smallest unit of speech or a basic unit of sound in a given language that distinguishes one word from another. An example of a phoneme would be the 't' found in words like "tip", "stand", "writer", and "cat". The term "sub-phoneme" as used herein is a portion of a phoneme found by dividing the phoneme into two or three parts.

A "phonemic transcription" of a word is a representation of the word comprising a series of phonemes. For example, the initial sound in "cat" and "kick" may be represented by the phonemic symbol 'k' while the one in "circus" may be represented by the symbol 's'. Further, ' ' is used herein to distinguish a symbol as a phonemic symbol, unless otherwise indicated. In contrast to a phonemic transcription of a word, the term "orthographic transcription" of the word refers to the typical spelling of the word.

The term "frame" and "phoneme frame" are used herein interchangeably and refer to portions of a speech signal of substantially equal durations or time windows.

The terms "model" and "phoneme model" are used herein interchangeably and used herein to refer to a mathematical representation of the essential aspects of acoustic data of a set of phonemes.

The term "length" as used herein refers to a time duration of a "phoneme" or "sub-phoneme". The term "speech" as used herein refers to unconstrained audio speech.

BRIEF SUMMARY

According to an aspect of the present invention there is provided a computerized method for detecting a target word in a speech signal. A speech recognition engine and a previously constructed phoneme model are provided. The speech signal is input into the speech recognition engine. Based on the phoneme model, the input speech signal is indexed. A time-ordered list is stored representing n-best phoneme candidates of the input speech signal and also stored are phonemes of the input speech signal in multiple phoneme frames. n is an integer typically between two and eight. The target word is transcribed into a transcription of target phonemes. The time-ordered list of n-best phoneme candidates is searched for a locus of said target phonemes. While searching, scoring is based on the ranking of the phoneme candidates among the n-best phoneme candidates and based on the number of the target phonemes found. A composite score of the probability of an occurrence of the target word is produced. When the composite score is higher than a threshold, start and finish times are output which bound the locus. The threshold is optionally previously determined, e.g. from the stored rankings. The start and finish times are input into an algorithm adapted for sequence alignment based on dynamic programming for aligning a first sequence with a second sequence. The first sequence is a portion of the phoneme frames, the portion is based on the start and finish times. The second sequence is the target phonemes. The phoneme model may explicitly include as a parameter the length of the phonemes. The phoneme model may include dividing phonemes into two or three sub-phonemes and the sub-phonemes are modeled acoustically using a plurality of Gaussian parameters based on a mixture model of Gaussian functions and an explicit length dependency. The length dependency is preferably modeled with a Poisson distribution. Typically, fewer than fifty phonemes are modeled in the phoneme model. The sequence alignment algorithm may be based on a Smith-Waterman algorithm. The sequence alignment is time-constrained to a portion of the speech signal substantially between the start and finish times. Prior to performing the sequence alignment, repetitive frames of the same phoneme of the first sequence are reduced to a single frame of the same phoneme. During indexing the phonemes are preferably stored in the phoneme frames as k best candidates of the phonemes in the phoneme frames. The sequence alignment may be performed over the k-best candidates. k is typically an integer between two and eight.

According to embodiments of the present invention there is provided a computer readable medium encoded with processing instructions for causing a processor to execute the methods disclosed herein.

BRIEF DESCRIPTION OF THE DRAWINGS

The invention is herein described, by way of example only, with reference to the accompanying drawings, wherein.

The foregoing and/or other aspects will become apparent from the following detailed description when considered in conjunction with the accompanying drawing figures.

DETAILED DESCRIPTION

Reference will now be made in detail to embodiments of the present invention, examples of which are illustrated in the accompanying drawings, wherein like reference numerals refer to the like elements throughout. The embodiments are described below to explain the present invention by referring to the figures.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "computer system" is defined as one or more software modules, one or more hardware modules, or combinations thereof, which work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone or Personal Digital Assistant "PDA") where internal modules (such as a memory and processor) work together to perform operations on electronic data.

Figure 6:
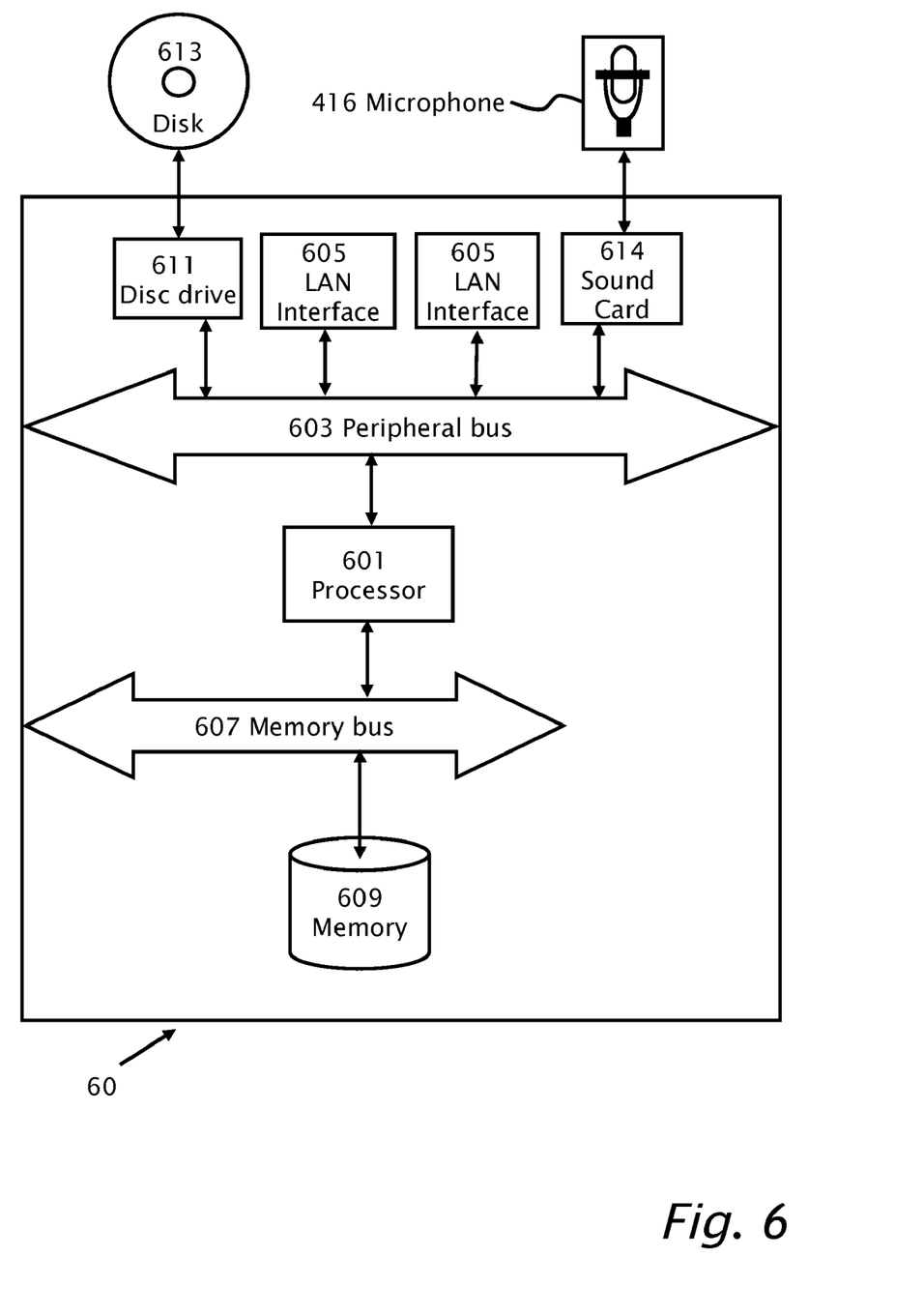
FIG. 6 illustrates schematically a simplified computer system according to conventional art.

Reference is now made to FIG. 6 which illustrates schematically a simplified computer system 60 according to conventional art. Computer system 60 includes a processor 601, a storage mechanism including a memory bus 607 to store information in memory 609 and a network interface 605 operatively connected to processor 601 with a peripheral bus 603. Computer system 60 further includes a data input mechanism 611, e.g. disk drive for a computer readable medium 613, e.g. optical disk. Data input mechanism 611 is operatively connected to processor 601 with peripheral bus 603. Operatively connected to peripheral bus 603 is sound card 614. The input of sound card 614 operatively connected to the output of microphone 416.

In this description and in the following claims, a "network" is defined as any architecture where two or more computer systems may exchange data. Exchanged data may be in the form of electrical signals that are meaningful to the two or more computer systems. Computer-executable instructions comprise, for example, instructions and data which cause a general-purpose computer system or special-purpose computer system to perform a certain function or group of functions.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

A conventional art speech recognition engine, typically incorporated into a digital signal processor (DSP), inputs a digitized speech signal, and processes the speech signal. The input speech signal is sampled, digitized and cut into frames of equal time windows or time duration, e.g. 25 millisecond window with 10 millisecond overlap. The frames of the digital speech signal are typically filtered, e.g. with a Hamming filter and then input into a circuit including a processor which performs a transform for instance a fast Fourier transform (FFT) using one of the known FFT algorithms.

Mel-frequency cepstral coefficients (MFCC) are commonly derived by taking the Fourier transform of a windowed excerpt of a signal to produce a spectrum. The powers of the spectrum are then mapped onto the mel scale, using the overlapping windows. Differences in the shape or spacing of the windows used to map the scale can be used. The logs of the powers at each of the mel frequencies are taken, followed by the discrete cosine transform of the mel log powers. The Mel-frequency cepstral coefficients (MFCCs) are the amplitudes of the resulting spectrum.

By way of introduction, embodiments of the present invention are directed to spoken term detection or word spotting using phoneme recognition which is a vocabulary independent approach using a phoneme lattice for phoneme recognition. A phoneme lattice represents multiple phoneme hypotheses for a given speech utterance. The accuracy of phoneme recognition in conversational speech using prior art methods is only about 50-60% because useful prior knowledge such as word language model and/or pronunciation dictionary is not used. Accuracy of phoneme recognition may be improved by using an n-best phoneme lattice instead of a one best sequence of phonemes in the index. n is an integer greater than two.

A phoneme model is constructed using a speech recognition engine trained on the known phoneme classes of a speech database. A speech database with known phonemes such as TIMIT for the 61 phoneme classes or the folded database of 39 phoneme classes is provided. The phoneme classes are often modeled as state probability density functions for each phoneme. Well known phoneme models include hidden Markov models, Gaussian mixture models and hybrid combinations thereof. After training on the database, the model parameters of the probability distribution functions are determined for each of the phoneme classes.

Construction of a phoneme model appropriate for embodiments of the present invention is disclosed in co-pending U.S. patent application Ser. No. 12/475,879 by the present inventors. The acoustic data of the phoneme is divided into either two or three sub-phonemes. A parameterized model of the sub-phonemes is built, in which the model includes multiple Gaussian parameters based on Gaussian mixtures and a length dependency such as according to a Poisson distribution. A probability score is calculated while adjusting the length dependency of the Poisson distribution. The probability score is a likelihood that the parameterized model represents the phoneme.

Figure 1:
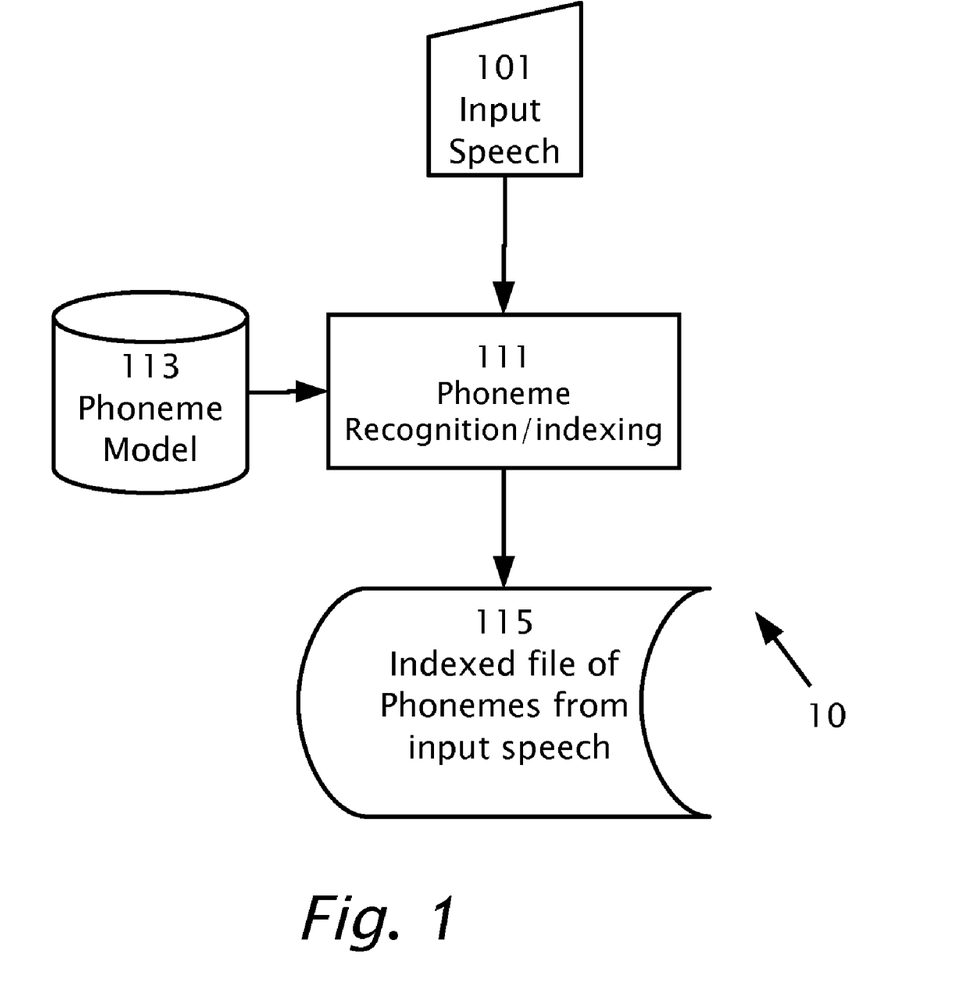
FIG. 1 illustrates a method, according to an embodiment of the present invention for generating an indexed file for use in spoken word detection.
Figure 2:
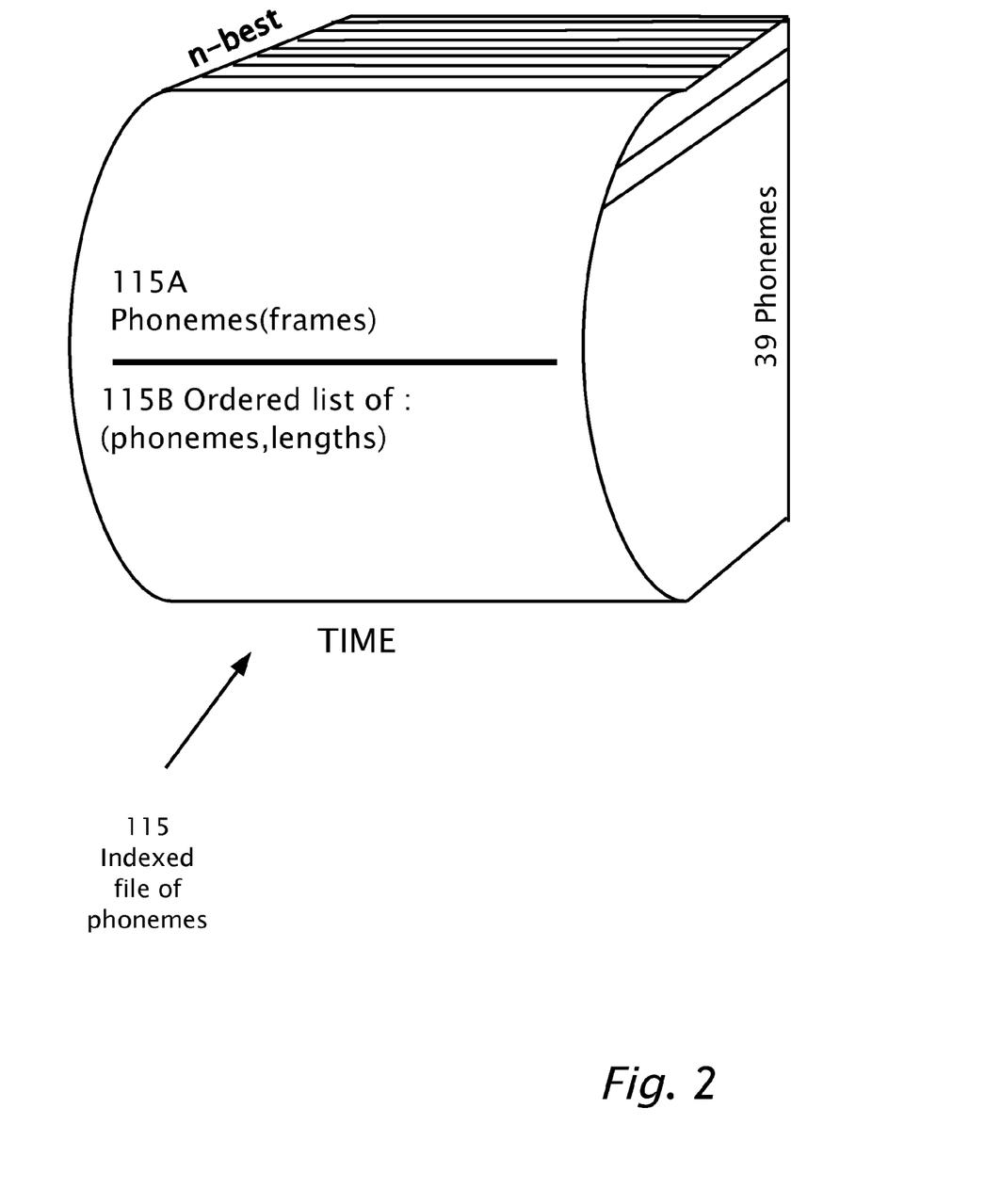
FIG. 2 illustrates conceptually data structures in indexed file, according to embodiments of the present invention.

Referring now to the drawings, FIG. 1 illustrates a method 10, according to an embodiment of the present invention for generating an indexed file for use in spoken word detection. An input speech signal 101, for instance an unconstrained live speech signal or a previously recorded signal is input into speech recognition engine 111 adapted for recognizing phonemes in input speech signal 101 based on a previously constructed phoneme model 113. An indexed file 115 of phonemes from the input speech signal is stored in memory 609. Reference is now also made to FIG. 2 which illustrates conceptually indexed file 115 in more detail, according to embodiments of the present invention. Indexed file 115 may include two indices or data structures pertaining to the phonemes recognized from input signal 101 as follows:

A. Phonemes recognized as a function of frames 115A, for instance 'w'w'o'o'o'o'o'sh'sh'sh' is an example of a phonemic recognition in frames of the word "wash". The phoneme 'w' extends over two frames, the phoneme 'o' extends over six frames and the phoneme 'sh' extends over three frames.

B. an ordered list 115B of recognized phonemes optionally with the lengths (i.e. time durations in frames) of the phonemes.

For either or both of these data structures the n-best, e.g. 8-best, recognized phonemes are stored index 115 for later searching. Ranking of the n-best phoneme matches is based on the probability distribution functions of phoneme model 113.

Figure 3:
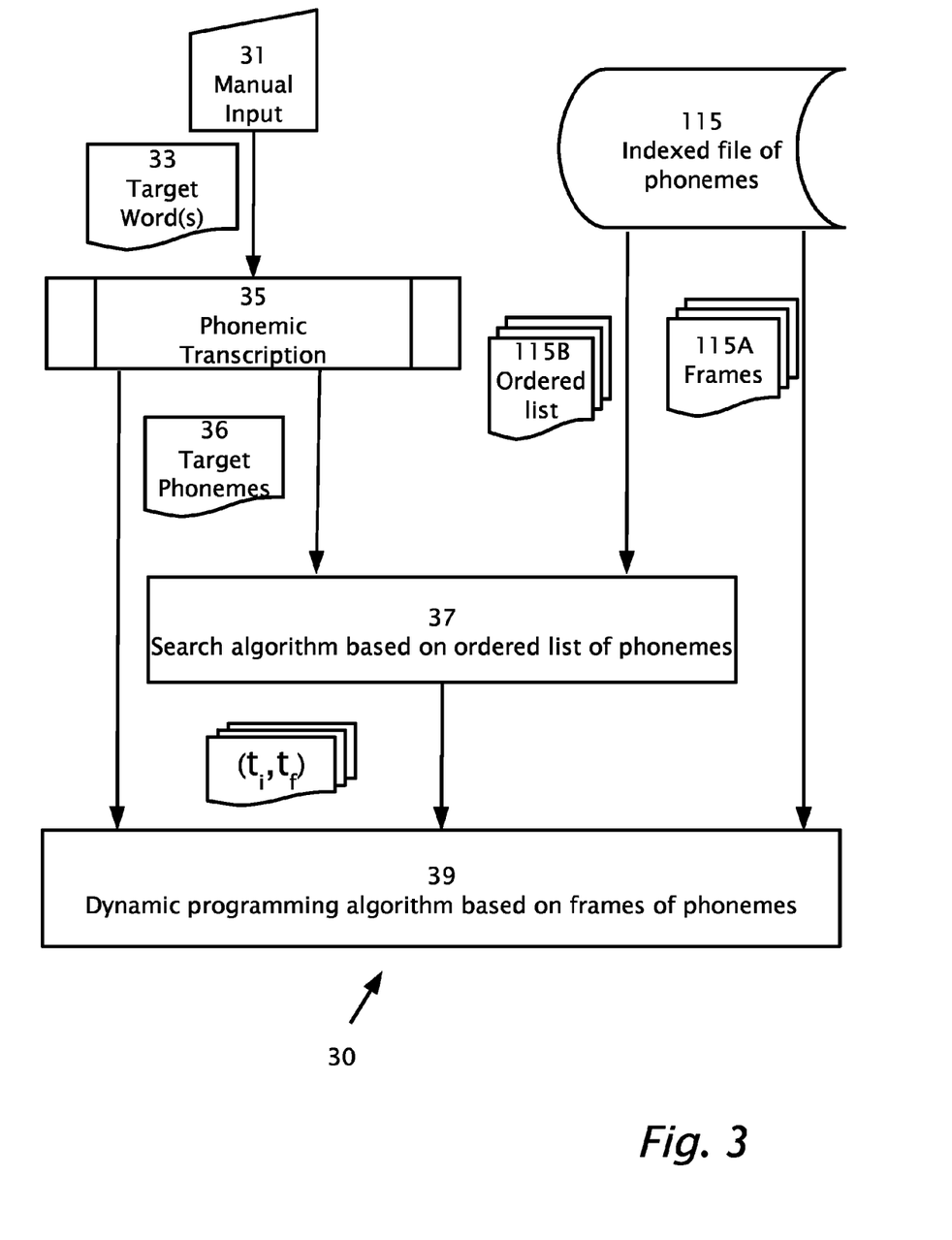
FIG. 3 illustrates a search method, according to embodiments of the present invention.

Reference is now also made to FIG. 3, which illustrates a search method 30, according to embodiments of the present invention. A target word 33 is manually input (step 31) for instance using a keyboard attached to computer system 60 or over a network connection. Target word 33 is phonemically transcribed (step 35) using any of the methods of phonemic transcription known in the art. Target phonemes 36 are input to search algorithm (step 37). Search algorithm (step 37) inputs from indexed file 115 an ordered list 115B of phonemes. Target phonemes 36 are searched within ordered list 115B. When a candidate for target phonemes 36 is found within order list 115B, a start time $t_i$ and a finish time $t_f$ which specify a time interval including the putative target word is passed to a second search algorithm (step 39) preferably based on dynamic programming using as input phonemes 115A as a function of frames from index file 115.

Figure 4:
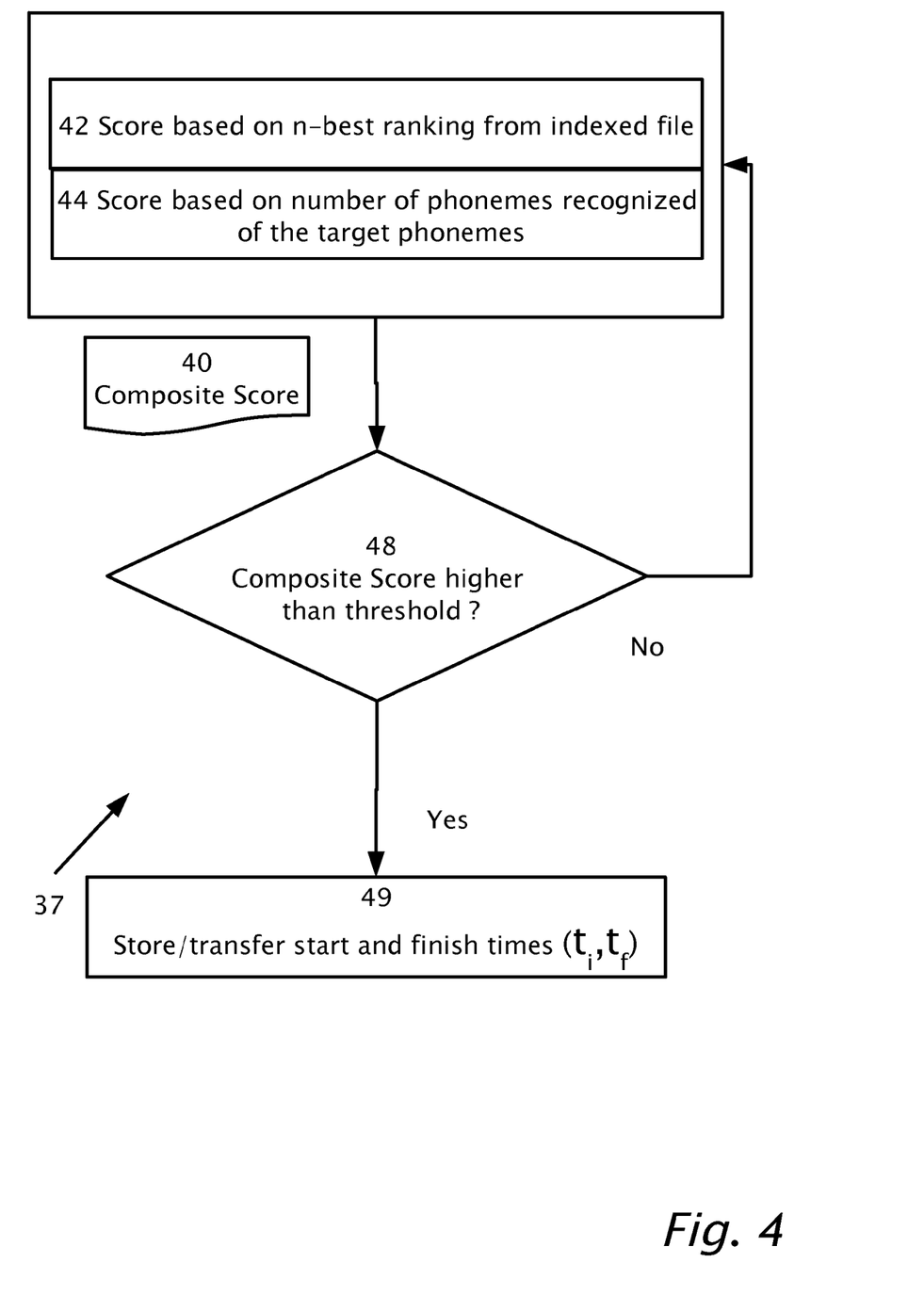
FIG. 4 illustrates a search algorithm, according to an aspect of the present invention.
Figure 5:
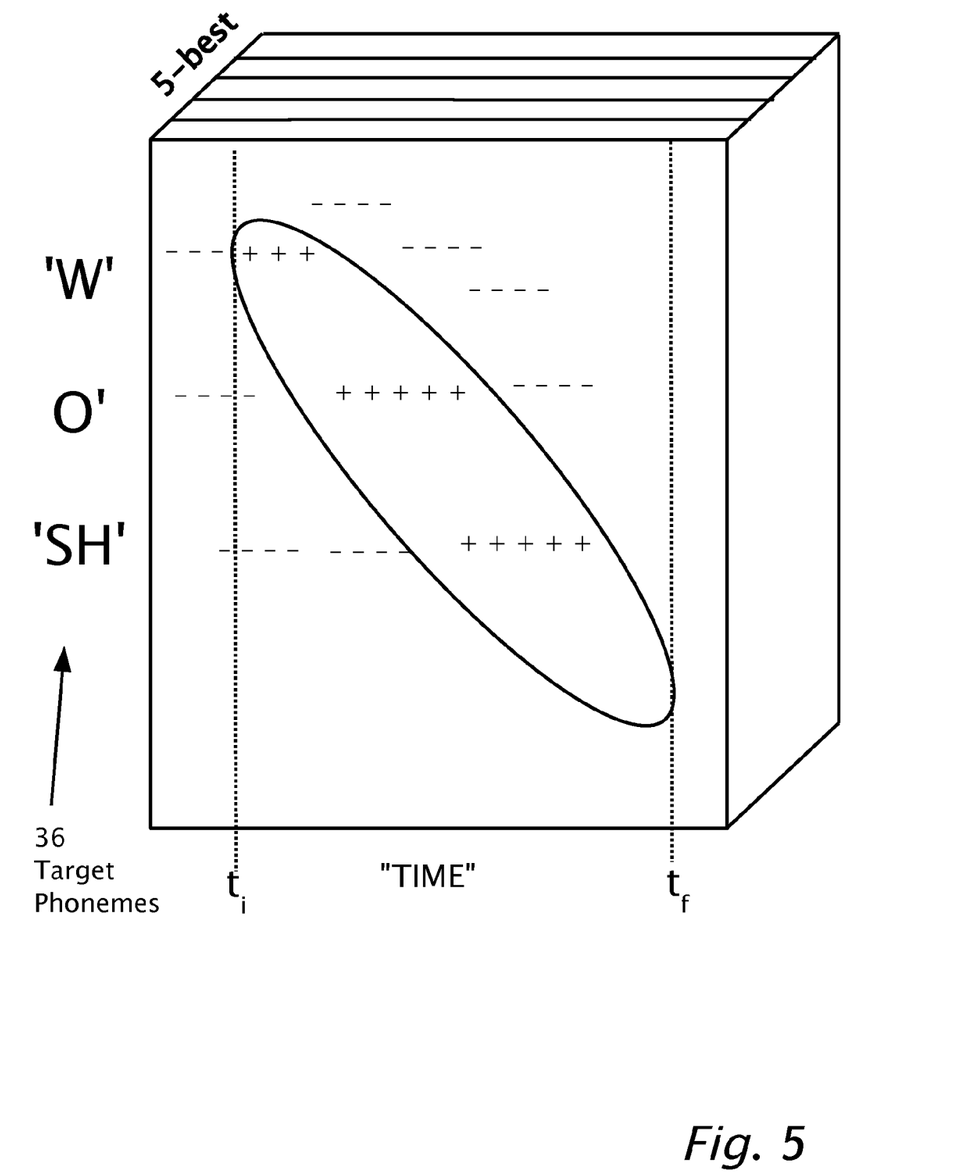
FIG. 5 illustrates a locus of target phonemes as recognized in ordered list using the algorithm of FIG. 3.

Reference is now made to FIG. 4 which illustrates in more detail search algorithm 37, according to an aspect of the present invention. Search algorithm 37 searches through ordered list 115B of indexed file 115 and calculates a composite score 40. Composite score 40 may be based both on n-best ranking (step 42) stored in index file 115 during indexing (step 111, FIG. 1) and on the number of phonemes recognized (step 44) of the number of target phonemes 36. For instance, in the word "wash" when three target phonemes, 'w', 'o', 'sh' are recognized, a higher composite score 40 is achieved than when only two of the target phonemes are recognized. Reference is now also made to FIG. 5, which illustrates a locus of target phonemes 36 as recognized in ordered list 115B. In FIG. 5, all three target phonemes 36 'w', 'o', 'sh' are recognized. The plus signs and minus signs indicate five best scores based on phoneme probabilities calculated during indexing (step 111). The locus includes probability scores for phoneme recognition greater than a threshold. In decision box 48, for sufficiently high composite scores 40, start and finish times $(t_i,t_f)$ are stored or transferred (step 49) for input to search algorithm (step 39). Otherwise, in decision box 48, if composite score 40 is not sufficiently high, scoring steps 42 and 44 continue as search 37 is performed through ordered list 115B of indexed file 115. The threshold used in decision box 48, may be previously determined or determined on-the-fly from the data stored in indexed file 115.

Reference is now made back to search method 30 shown in FIG. 3. Start and finish times $(t_i,t_f)$ are input to a sequence alignment algorithm preferably based on a dynamic program algorithm such as the well known Smith-Waterman algorithm for sequence alignment in which one sequence is target phonemes 36 and the second sequence is a portion of frames 115A. Sequence alignment is constrained by the start and finish times $(t_i,t_f)$ which with the frames being searched/aligned. Typically, if multiple start and finish times $(t_i,t_f)$ specify overlapping time intervals then a single time interval is used. The sequence alignment algorithm may be further refined by limiting alignment for phonemes which repeat in successive frames to the same phoneme in a single frame. In the example used above, 'w'w'o'o'o'o'o'sh'sh'sh' is modified to 'w'_o'_'sh' with gaps in the redundant frames without a gap penalty. Optionally, if during indexing n-best phoneme frames are stored, sequence alignment may be performed over the n-best phoneme frames within the time interval defined by start and finish times $t_i$ and $t_f$.

The definite articles "a", "an" is used herein, such as "a sub-phoneme", "a probability density function" have the meaning of "one or more" that is "one or more sub-phonemes" or "one or more probability density functions".

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

The invention claimed is:

1. A computerized method of detecting a target word in a speech signal, the method comprising:
   providing a speech recognition engine and a previously constructed phoneme model;
   inputting the speech signal into the speech recognition engine;
   based on the phoneme model, indexing the input speech signal, thereby storing a time-ordered list representing n-best phoneme candidates of the input speech signal and phonemes in a plurality of phoneme frames, wherein n is an integer between two and eight;
   transcribing the target word into a transcription of target phonemes;
   searching through said time-ordered list of n-best phoneme candidates for a locus of said target phonemes;
   while said searching, scoring based on the ranking of the phoneme candidates among the n-best phoneme candidates and based on the number of said target phonemes found, thereby producing a composite score of the probability of an occurrence of the target word;
   when said composite score is higher than a threshold, outputting start and finish times bounding said locus;
   inputting said start and finish times into an algorithm adapted for sequence alignment based on dynamic programming; and
   using said algorithm aligning a first sequence with a second sequence, wherein said first sequence is a portion of said phoneme frames, wherein said portion is based on said start and finish times and wherein said second sequence is said target phonemes.

2. The method of claim 1, wherein said phoneme model explicitly includes as a parameter a length of the phonemes.

3. The method of claim 1, wherein said phoneme model includes dividing a plurality of phonemes into two or three sub-phonemes and modeling said sub-phonemes acoustically using a plurality of Gaussian parameters based on a mixture model of Gaussian functions and an explicit length dependency.

4. The method of claim 3, wherein said length dependency is a Poisson length dependency.

5. The method of claim 1, wherein fewer than fifty phonemes are modeled in said phoneme model.

6. The method of claim 1, wherein said sequence alignment algorithm is based on a Smith-Waterman algorithm.

7. The method of claim 1, wherein said sequence alignment is time constrained to a portion of the speech signal substantially between said start and finish times.

8. The method of claim 1, further comprising, prior to performing said sequence alignment, reducing in said first sequence repetitive frames of the same phoneme to a single frame of the same phoneme.

9. The method of claim 1, wherein storing said phonemes in said phoneme frames includes storing k best candidates of said phonemes in said phoneme frames and wherein said aligning is performed over said k-best candidates, wherein k is an integer between two and eight.

10. The method of claim 1, wherein said threshold is previously determined.

11. A non-transitory computer readable medium encoded with processing instructions for causing a processor to execute the method of claim 1.

* * * * *